United States Patent [19]

Dummer

[11] 4,382,360
[45] May 10, 1983

[54] UNLOADING ARRANGEMENT FOR HYDRAULIC SWING CIRCUIT OR THE LIKE

[75] Inventor: Robert E. Dummer, Greenfield, Wis.

[73] Assignee: Bucyrus-Erie Company, South Milwaukee, Wis.

[21] Appl. No.: 187,579

[22] Filed: Sep. 15, 1980

[51] Int. Cl.³ .............................................. F16H 39/46
[52] U.S. Cl. ........................................ 60/444; 60/451; 60/465; 60/468
[58] Field of Search ................. 60/444, 465, 468, 451

[56] References Cited

U.S. PATENT DOCUMENTS

| | | | |
|---|---|---|---|
| 2,501,483 | 3/1950 | Taylor | 121/46 |
| 2,588,928 | 3/1952 | Humpal et al. | 212/35 |
| 2,643,515 | 6/1953 | Harsch | 60/52 |
| 2,841,960 | 7/1958 | Holan et al. | 60/97 |
| 3,011,652 | 12/1961 | Falk et al. | 212/67 |
| 3,555,817 | 1/1971 | Hann | 60/444 |
| 3,981,374 | 9/1976 | Johns | 60/468 X |
| 3,999,387 | 12/1976 | Knopf | 60/465 X |

Primary Examiner—Gerald A. Michalsky
Attorney, Agent, or Firm—Quarles & Brady

[57] ABSTRACT

A closed loop hydraulic swing circuit is provided with crossover auxiliary actuating connections between the pump control lines and the system relief valves to cause the relief valves to open at lower than maximum system pressure in an unloading action that limits braking when a coasting load is causing the motor to return more fluid than the pump can accept.

8 Claims, 4 Drawing Figures

4,382,360

UNLOADING ARRANGEMENT FOR HYDRAULIC SWING CIRCUIT OR THE LIKE

BACKGROUND OF THE INVENTION

This invention relates, but is not necessarily limited to, closed loop hydraulic swing circuits for cranes or the like, and more particularly to solving a problem that can occur when the load is allowed to coast and results in an overrunning torque load that causes an excess flow condition in which the motor returns more fluid to the pump than the pump can accept.

A conventional hydraulic swing system includes a reversible variable displacement pump driven by an engine, and a bi-directional hydraulic motor connected in a closed loop with the pump. There are appropriate relief valves connected across the loop to relieve respective main lines when the pressure exceeds a predetermined maximum system pressure, the relief valves being piloted off their respective main lines. There is a primary control valve to selectively pressurize pump control lines, and a secondary control or null-out valve to provide smooth acceleration.

The operator of such a system will often allow the load to coast. This is done by increasing engine speed and stroking the pump for a brief period of time to build up momentum, and then allowing the engine to idle and returning the primary control valve to neutral. During coasting, the secondary control valve is responsive to pressure in what is then the return line and, if required, will cause the pump to stroke to full displacement in the direction required to accept fluid being returned by the motor. Particularly if, as often happens, the operator has initiated a high coasting speed, situations can arise in which the pump, even at full displacement, cannot accept all of the returning fluid and the result can be a sudden and/or erratic braking action that can cause serious damage to the machine, the load, or surrounding structures that the load may strike in a resulting swinging action. The associated system relief valve will ultimately relieve pressure in the return line, but the setting is necessarily too high to prevent braking of a magnitude sufficient to cause damage. The situation can also be corrected by accelerating the engine to increase pump speed, and therefore the ability of the pump to accept fluid, but it is not a natural act for the operator to accelerate when faced with an overrunning load and so it is not likely that the proper step will be taken before damage is done.

SUMMARY OF THE INVENTION

The circuit of this invention provides crossover auxiliary actuating connections between the pump control lines and the system relief valves that are cumulative with the main actuating connections for the relief valves. The net effect is that, only during a coasting action when it is the return line that is under pressure, the relief valve associated with that line will open at a maximum coast pressure that is lower than the maximum system pressure, to unload the return line and limit braking in the event of an excess flow condition. In the preferred embodiment, the relief valves are facing counterbalance valves connected across the loop, which represents a unique application for such valves.

The system of the invention is highly effective, all hydraulic, readily adaptable to standard swing circuits or the like, and relatively simple and inexpensive. Other objects and advantages will appear from the description to follow.

DESCRIPTION OF THE PREFERRED EMBODIMENTS

Figure 1:
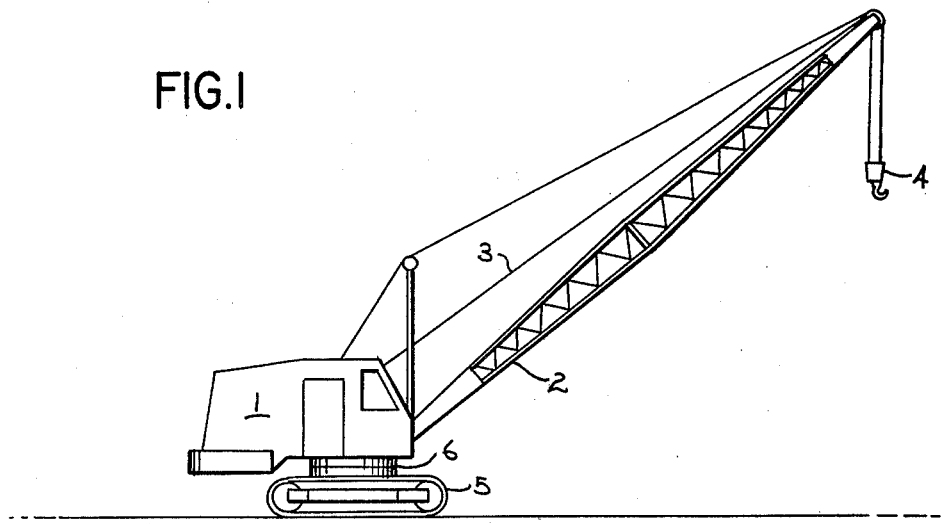
FIG. 1 is a schematic representation of a crane incorporating a swing circuit according to the invention.

The crane in FIG. 1 is shown only to illustrate a preferred application for the invention. Such machines are conventional and well known to those skilled in the art, so it is shown only schematically and will be described only briefly. The machine includes a machinery platform and housing 1 and a boom 2. The hoist arrangement includes a conventional rope arrangement 3 and a hook 4. The platform 1 and associated elements are rotatably mounted on crawlers 5 by means of a conventional swing table arrangement 6, and it is this arrangement that is operated by the circuit to be described.

Figure 2:
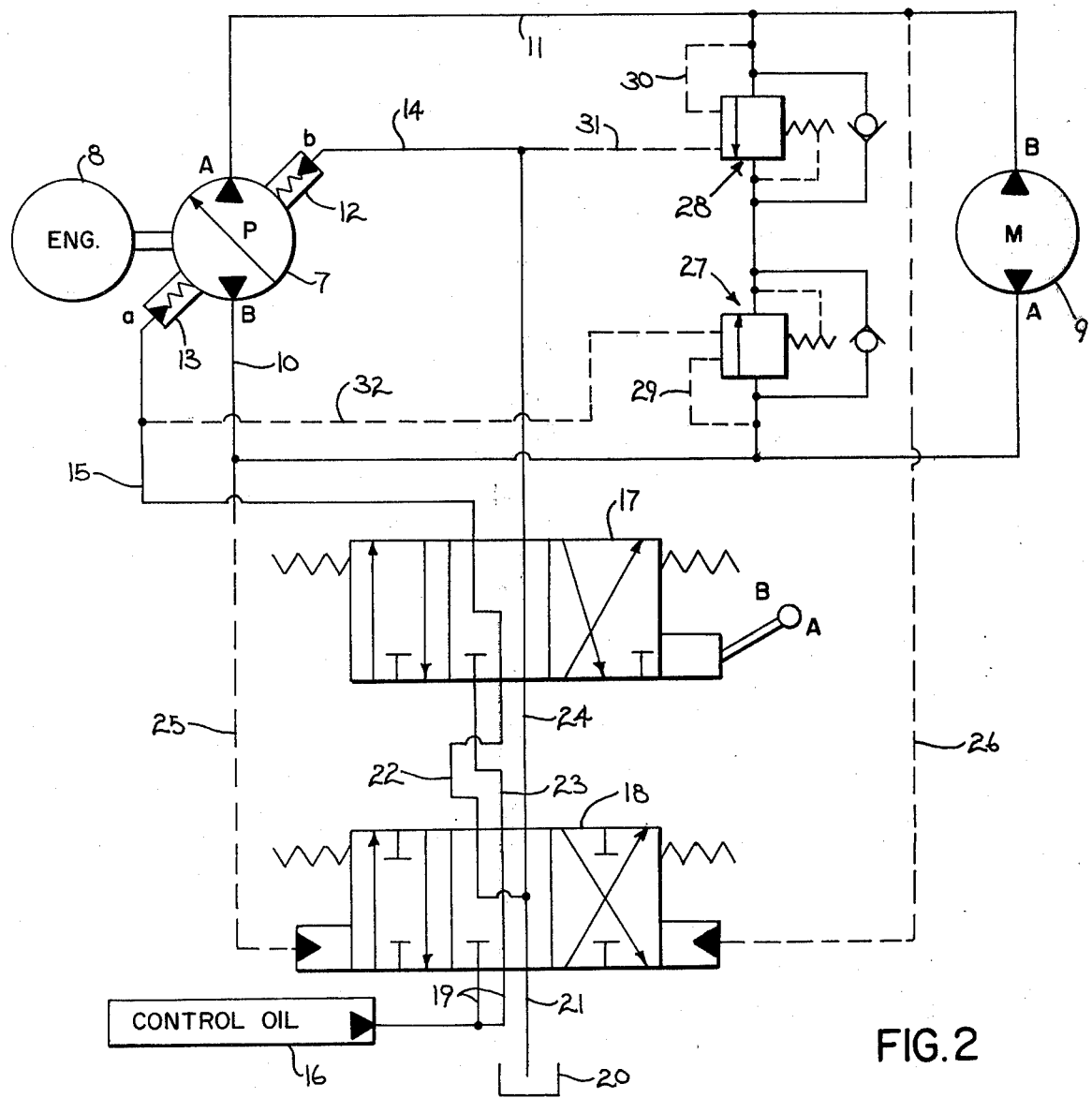
FIG. 2 is a schematic hydraulic circuit diagram illustrating a preferred embodiment of the invention.

The swing circuit of FIG. 2 is shown schematically and appurtenant elements well known to those skilled in the art, such as a makeup oil circuit, have been omitted for the sake of simplicity and clarity. The circuit includes a reversible variable displacement pump 7 that is driven by a suitable prime mover, an internal combustion engine 8 in the preferred embodiment. A bi-directional hydraulic motor 9, which actually drives the swing table arrangement 6 in conventional fashion, has a closed loop connection with the pump 7 through a first main line 10 and a second main line 11.

The pump 7 may be of any suitable type, and in the preferred embodiment is an axial piston pump. It is normally biased toward a neutral or a zero displacement position. It has a first servo port 12 which can be pressurized to move the pump 7, through a range from zero to maximum displacement, to a first operating position in which pressurized fluid is delivered through the first line 10 to the motor 9 and return fluid passes through the line 11 back to the pump 7. Similarly, there is a second servo port 13 pressurizable to move the pump 7 to a second operating position in which pressurized fluid is delivered to the second line 11 and return fluid passes through the line 10. Through the servo ports 12 and 13, the pump 7 and motor 9 can be made to operate in either direction, with the speed of the motor 9 dependent on the displacement of the pump 7 and the speed of the engine 8.

The pump 7 is controlled by a circuit including a first control line 14 connected to first servo port 12 and pressurizable to cause the pump to move to its first operating position, and a second control line 15 connected to the port 13 and pressurizable to cause the pump to move to its second operating position. Control pressure is provided by any suitable conventional source, shown schematically at 16, through a primary control valve 17 and a secondary control valve 18. Control fluid under pressure is delivered to the valves 17 and 18 through a branched pressure line 19 and returns to a reservoir 20 through a return line 21. Lines 22, 23 and 24 extend between the valves 17 and 18.

The valves 17 and 18 are normally biased to centered or neutral positions shown in FIG. 2. In such positions, one branch of the pressure line 19 is blocked at the valve 18, while the other branch passes through to the line 23 but is blocked at the valve 17. The control lines 14 and 15 are both connected to the reservoir 20 through the lines 22, 24 and 21, so that the pump 7 can and will move to its centered or neutral position.

The primary control valve 17 is manually actuated and provides variable delivery, and it is the valve directly used by the operator to control the system. Assuming for the moment no actuation of the valve 18, if the valve 17 is moved to the left to what can be termed a first position, control pressure will be delivered to the first control line 14 and first servo port 12 so that the pump will be stroked to deliver pressurized fluid to the first main line 10, the second control line 15 then being vented to tank through the lines 22 and 21; if the valve 17 is moved to the right to a second position, the second control line 15 is pressurized to move the pump 7 to second position wherein the line 11 is pressurized, while the line 14 is vented to tank through the lines 24 and 21.

The secondary control valve 18 is a conventional "null-out" valve that serves during normal operation to prevent surges and provide smooth acceleration. It is normally biased to the centered or neutral position shown in FIG. 2, but has opposite first and second pilot connections 25 and 26 to, respectively, the first and second main lines 10 and 11, as the result of which it is responsive to pressure in such lines to govern control pressure delivered to the valve 17. Assuming the valve 17 has been moved to the left to its first position, wherein the line 10 is pressurized, pressure will be felt through the pilot line 25 at the left side of the valve 18 tending to move it to the right. The valve 18 also operates variably, and such movement to the right tends to block the right branch of the line 19 while allowing a countercontrol pressure to be felt in the line 15 through the line 22. When the valve 17 is moved to its right or second position, in which the second control line 15 is pressurized, the resulting pressure in the second main line 11 will operate, through the second pilot line 26, to urge the valve 18 to the left, and such movement will tend to block control pressure to the line 15 by blocking the right branch of the line 19 while providing a counterpressure to the line 14 through the left branch of the line 19 and line 24. As indicated above, this is a conventional arrangement to provide for smooth acceleration.

The valves 17 and 18 thus operate together and allow the operator to actuate the pump 7 in either direction at any level between zero and maximum displacement, and in this way to control the speed and direction of the motor 9, bearing in mind that the motor speed will also depend on the speed of the engine 8.

System relief is provided by facing first and second counterbalance valves 27 and 28 connected between the main lines 10 and 11 and thus across the loop. It is conventional to provide system relief by connecting relief valve means across the loop, but it is not conventional to use counterbalance valves for this purpose, the more usual arrangement being that shown in the embodiment of FIG. 3 to be discussed later. The first counterbalance valve 27 is associated with the first main line 10 and has a main actuating connection therewith in the form of a pilot operating line 29. The second counterbalance valve 28 is associated with the second main line 11, and has a main actuating connection therewith in the form of a pilot line 30. In the preferred embodiment, both counterbalance valves are set to open at approximately 6000 lbs. of pressure, which is the predetermined maximum system pressure. Notwithstanding the fact that the valves 27 and 28 are in opposing or facing relationship and in series across the loop, neither will interfere with the normal operation of the other. That is, fluid allowed to pass through the valve 27 can pass freely through the check valve portion of the valve 28 and vice versa.

The system as thus far described can be and is used in a coasting mode. If the operator desires to coast in a first direction, he will accelerate the engine 8 and move the primary control valve 17 to the left, thus pressurizing the first main line 10 and, subject to the acceleration modulation of the valve 18, causing the load to accelerate in that direction. When the desired speed has been reached, the operator will allow the engine 8 to idle and move the valve 17 back to neutral. The inertia of the load will cause continued movement, during which the motor 9 will effectively act as a pump delivering return fluid through the second main line 11. During coasting, the valve 18 has a somewhat different function. The return line 11 is then pressurized relative to the line 10, and this pressure will, through the line 26, cause the valve 18 to move to the left. This in turn results in pressurizing of the first control line 14, which strokes the pump 7 to maximum displacement to accept returning fluid. Coasting in the other direction is accomplished in the same manner, but by first moving the valve 17 to the right and then returning it to neutral. When the load is coasting in the other direction, the main line 10 will be the pressurized return line, and the pressure in it will cause the valve 18 to move to the right, thus pressurizing the second control line 15 to stroke the pump 7 to maximum displacement in that direction for accepting return fluid.

Coasting as described above presents no problem so long as the pump 7 has the capacity to accept all of the fluid being returned from the motor 9. If it cannot do so even at maximum displacement, however, there can be a sudden or erratic braking action which can cause serious damage to the machine, the load, or surrounding structures. The capacity of the pump 7 to accept returning fluid could be increased by accelerating the engine 8, but it is not natural for the operator to do so and by the time this action is taken serious damage may have already been done. The valves 27 and 28 will also operate to limit braking at maximum system pressure, but this is ordinarily too high to prevent damage. The maximum system pressure is set relatively high for maximum efficiency, and can be set at a relatively high level at least in part because of the modulating effect of the valve 18 during normal operation. There is no such modulating effect during coasting, however, and so relief must be provided at a substantially lower level. It is this problem that the invention is designed to prevent.

The invention provides an auxiliary crossover actuating connection, in the form of a pilot line 31, between the first control line 14 and second relief valve 28, and another auxiliary crossover actuating connection, in the form of a pilot line 32, between the second control line 15 and the first relief valve 27. The valves 27 and 28 must as a result be adapted for dual pilot operation, but such valves are conventional and easily obtainable. It is also desirable, and readily possible with standard components, to have a differential pilot ratio with the auxiliary actuating connections being accorded greater weight-a standard valve for this purpose may have pressure from the pilot line to be given greater weight applied across the entire end surface of a poppet while the pressure from the pilot line to be given lesser weight is felt only around a circumferential shoulder. In the preferred embodiment, the pilot ratio is approximately 18:1, which means that the pressures in the auxiliary operating connections 31 and 32 will be felt in the respective valves 28 and 27 as being approximately eighteen times as great as the actual pressures.

During a normal coasting operation, for example when the line 11 is the pressurized return line and the control line 14 has been pressurized through action of the valve 18 to stroke the pump 7 to maximum displacement, the pressure in the line 14 will be approximately 150 psi. Because of the 18:1 ratio, this will be felt by the valve 28 as a pressure of approximately 2700 psi. This pressure signal is cumulative with that provided by the main actuating connection 30, which means that the valve 28 will open at a maximum coasting pressure in the line 11 of approximately 3300 psi, as opposed to usual system relief pressure of 6000 psi. The valve 27 will open similarly when the first main line 10 is the pressurized return line during coasting.

Specific pressure settings will depend on various considerations well known to those skilled in the art. The crossover connections between the first control line 14 and second relief valve 28 and between the second control line 15 and first relief valve 27 should always, however, provide for opening of the associated relief valve at a maximum coasting pressure substantially less than maximum system pressure.

The crossover connections have no appreciable effect during normal operation. In the case of the valve 27, for example, pressure in the pilot line 32 will be felt and be cumulative with pressure in the main pilot line 29 during normal operation, but pressure in the line 32 will normally be at a very low level, approximately 20 psi in the preferred embodiment, so that, even when multiplied, it will not have a substantial effect and will, if anything, simply cause relief at a lower pressure.

Figure 3:
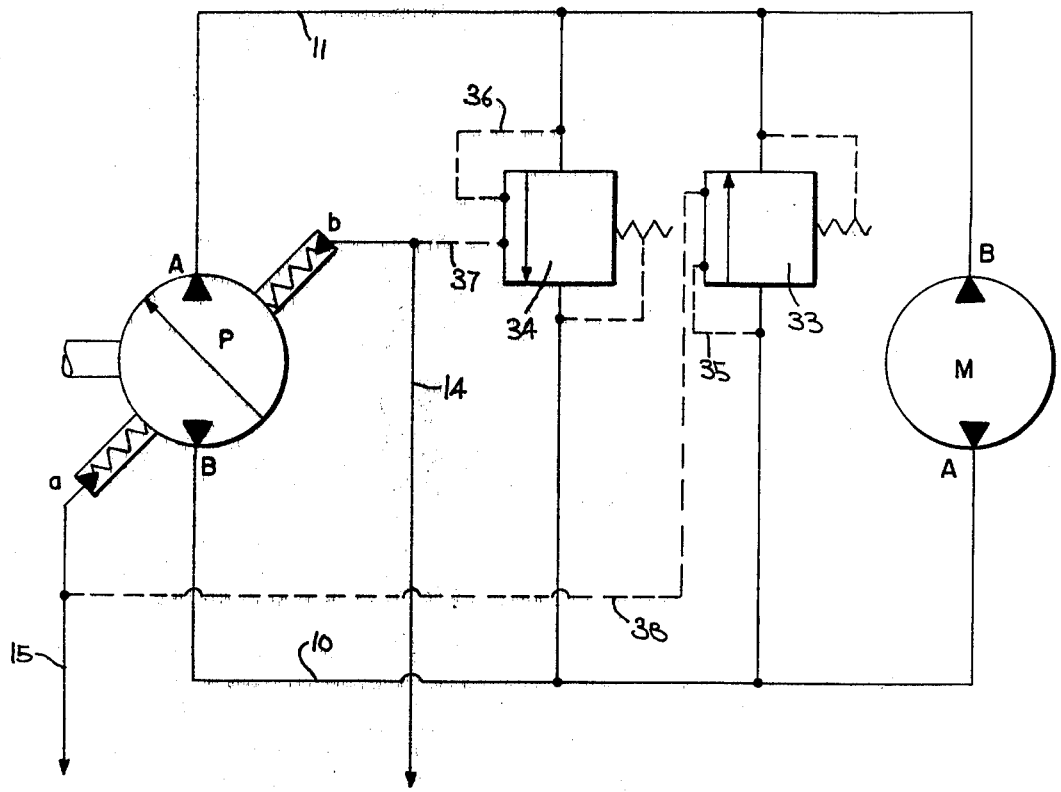
FIGS. 3 and 4 are partial schematic hydraulic circuit diagrams, based on FIG. 2 and using like reference numerals for like parts, illustrating, respectively, second and third embodiments.
Figure 4:
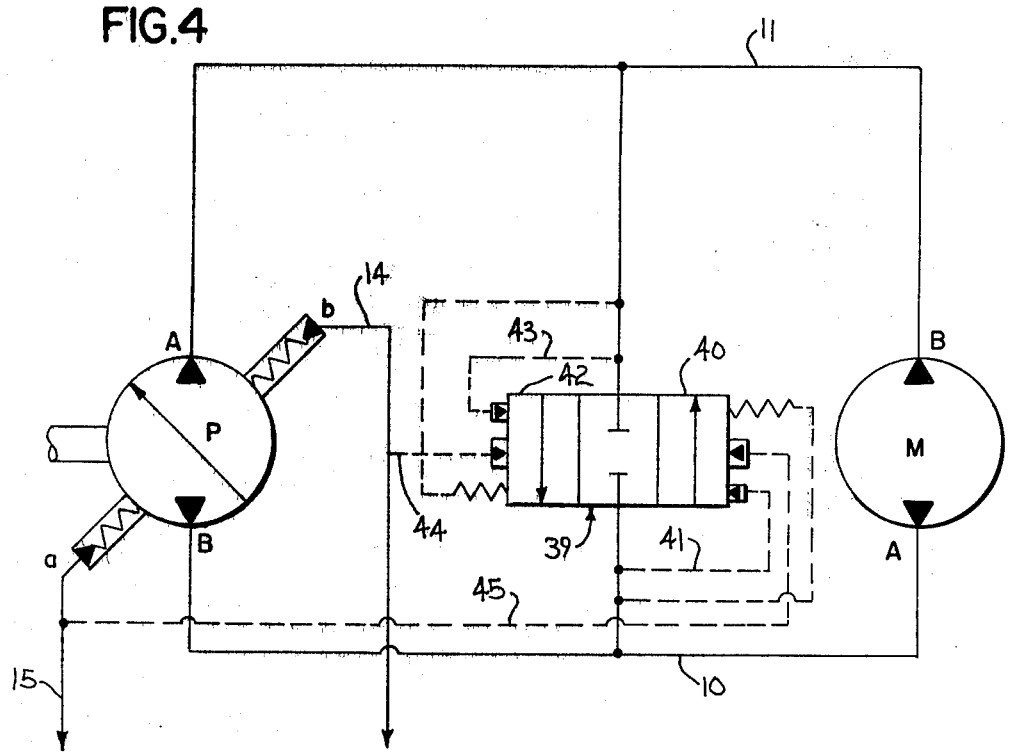

The embodiments of FIGS. 3 and 4 are identical to that of FIG. 2 except for the specific relief valving, and so corresponding reference numerals have been used for like parts and only partial circuit diagrams are shown. The embodiment of FIG. 3 utilizes a more conventional system relief arrangement including first and second pilot operated relief valves 33 and 34 connected in parallel across the loop. The first relief valve 33 is associated with the first main line 10 and has a main actuating connection therewith in the form of a pilot line 35. The second relief valve 34 is associated with the second main line 11 and its main actuating connection is a pilot line 36. A pilot line 37 serves as the auxiliary actuating connection between the first control line 14 and second relief valve 34, while a pilot line 38 serves as the auxiliary actuating connection between the second control line 15 and first relief valve 33. The system functions in essentially the same fashion as the embodiment of FIG. 2, with the valve 33 opening when maximum coasting pressure is exceeded in the line 10 and the valve 34 opening when maximum coasting pressure is exceeded in the line 11.

In the embodiment of FIG. 4, two relief valves are essentially incorporated in a single, three position valve 39 that is normally biased to the centered closed position shown. The right envelope portion 40 can be considered a first relief valve associated with the line 10 and having a primary actuating connection therewith in the form of a pilot line 41. The left envelope portion 42 constitutes a second relief valve associated with the line 11 and having a primary or main actuating connection in the form of a pilot line 43. A pilot line 44 serves as the auxiliary actuating connection between the first control line 14 and the second relief valve 42, and a pilot line 45 is the auxiliary actuating connection between the second control line 15 and first relief valve 40. Again, operation is essentially the same as for the embodiment of FIG. 2. The valve 39 will move to the left to open the first relief valve 40 when maximum coasting pressure is exceeded in the line 10, and it will move to the right to open second relief valve 42 when maximum coasting pressure is exceeded in the line 11.

While preferred embodiments of the invention have been shown and described, it will be obvious that various modifications are possible without departure from the spirit of the invention. As indicated, various relief valves and valve arrangements may be used. Various pumps and motors can be used, including reversible constant displacement pumps. The invention may be incorporated in swing circuits for various machines, or in other hydraulic circuits, including circuits that are not closed loops and/or operate in only one direction. In view of the possible modifications, the invention is not intended to be limited by the showing or description herein, or in any other manner except insofar as may specifically be required.

I claim:

1. In a hydraulic circuit having a reversible pump, a bi-directional hydraulic motor, at least one main line connecting the pump and motor that serves as a pressure line for delivering fluid from the pump to the motor when the pump and motor are operating in one direction and that serves as a return line for returning fluid from the motor to the pump when the pump and motor are operating in the other direction, at least one relief valve associated with the main line that has a primary actuating connection with the main line to be opened in response to pressure in said main line that exceeds a predetermined maximum system pressure, and a control circuit for the pump including at least one control line that is connected to the pump and can be pressurized to stroke the pump toward a position for accepting return flow from the motor when there is a coasting load on the motor, the improvement wherein:
there is a secondary actuating connection between said control line and said relief valve that is cumulative with said main actuating connection so that when said main line is returning fluid during a coasting action the relief valve will open at a predetermined maximum coasting pressure that is lower than said maximum system pressure and that represents inability of the pump to accept additional return flow from the motor.

2. In a hydraulic swing circuit or the like having
a reversible pump and a bi-directional hydraulic motor connected in a closed loop by first and second main hydraulic lines, the pump being biased toward a neutral position and movable to first and second operating positions wherein, respectively, it delivers fluid under pressure to the first and second main lines while accepting return fluid from the other main line,
first and second relief valves connected across the loop and associated, respectively, with the first and second main lines, each relief valve having a main actuating connection with its associated main line to open in response to pressure therein that exceeds a predetermined maximum system pressure, and a control circuit for the pump including:

first and second hydraulic control lines connected to the pump and pressurizable, respectively, to move the pump to its first and second operating positions, primary control valve means operable to selectively pressurize the control lines and having a neutral position in which the pump is allowed to move to neutral position and in which a moving load on the motor is allowed to coast, and secondary control valve means connected to the main lines and the control lines and responsive to coasting-load induced pressure in either the first or second main line to cause, respectively, the pump to move to its second or first position to accept fluid returning through the main line involved, the improvement wherein:

the first relief valve has an auxiliary actuating connection with the second control line and the second relief valve has an auxiliary actuating connection with the first control line, each auxiliary actuating connection being cumulative with the main actuating connection for the associated relief valve so that said valve will open at a predetermined maximum coasting pressure that is lower than the maximum system pressure to limit braking resulting from the inability of the pump to accept all return fluid being delivered to it during coasting.

3. A circuit according to claim 2, wherein:

the pump is a variable displacement pump;

the secondary control valve means can cause the pump to be moved to maximum displacement in either pump operating position for accepting return fluid during coasting;

and the maximum coasting pressure is higher than the main line pressure required to cause the pump to move to such maximum displacement positions.

4. A circuit according to claim 3, wherein:

the relief valves are pilot-operated;

and the main and auxiliary actuating connections for each relief valve are dual pilot lines.

5. A circuit according to claim 4, wherein:

the relief valves have differential pilot ratios with the auxiliary actuating connections having substantially greater weight than the main actuating connections.

6. A circuit according to claim 5, wherein:

the relief valves are facing counterbalanced valves connected in series across the loop.

7. A circuit according to claim 5, wherein:

the relief valves are one-way pilot-operated relief valves connected separately and oppositely across the loop.

8. In a hydraulic swing circuit or the like having a reversible pump and a bi-directional hydraulic motor connected in a closed loop by first and second main hydraulic lines, the pump being biased toward a neutral position and movable to first and second operating positions wherein, respectively, it delivers fluid under pressure to the first and second main lines while accepting return fluid from the other main line, a relief valve connected across the loop and having first and second portions associated, respectively, with the first and second main lines, each portion of the relief valve having a main actuating connection with its associated main line to open in response to pressure therein that exceeds a predetermined maximum system pressure, and a control circuit for the pump including:

first and second hydraulic control lines connected to the pump and pressurizable, respectively, to move the pump to its first and second operating positions, primary control valve means operable to selectively pressurize the control lines and having a neutral position in which the pump is allowed to move to neutral position and in which a moving load on the motor is allowed to coast, and secondary control valve means connected to the main lines and the control lines and responsive to coasting-load induced pressure in either the first or second main line to cause, respectively, the pump to move to its second or first position to accept fluid returning through the main line involved, the improvement wherein:

the relief valve is operable in a center closed position and two open positions, the first portion of the relief valve having an auxiliary actuating connection with the second control line, the second portion of the relief valve having an auxiliary actuating connection with the first control line, each auxiliary actuating connection being cumulative with the main actuating connection to its respective portion of the relief valve, the relief valve being biased to the center closed position and caused through the main and auxiliary connections to move to a selected one of its two open positions, the valve passing fluid in one direction when moved to a first one of its two open positions and the valve passing fluid in an opposite direction when moved to a second one of its two open positions, the valve moving to the selected one of its two open positions at a predetermined maximum coasting pressure that is lower than the maximum system pressure to limit braking resulting from the inability of the pump to accept all return fluid being delivered to it during coasting.

* * * * *